US006271309B1

(12) United States Patent
Roberts et al.

(10) Patent No.: US 6,271,309 B1
(45) Date of Patent: Aug. 7, 2001

(54) CURABLE COMPOSITIONS COMPRISING THE HYDROSILATION PRODUCT OF OLEFIN-CONTAINING POLYMERS AND ORGANOSILOXANE HYDRIDES, CURED COMPOSITIONS MADE THEREFROM, AND METHODS OF MAKING SAME

(75) Inventors: Gary P. Roberts, Stillwater; Steven J. Vander Louw, Woodbury, both of MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 09/365,274

(22) Filed: Jul. 30, 1999

(51) Int. Cl.$^7$ ................................ C08L 83/10; C08F 8/00
(52) U.S. Cl. .................... 525/106; 526/335; 525/342; 525/100; 525/479; 502/325; 427/387
(58) Field of Search ........................ 525/342, 106, 525/100, 479; 526/335; 502/325; 427/387

(56) References Cited

U.S. PATENT DOCUMENTS

| | | |
|---|---|---|
| 4,230,815 * | 10/1980 | Itoh et al. . |
| 4,417,069 | 11/1983 | Brown, Jr. . |
| 5,233,071 | 8/1993 | Wilczek . |
| 5,484,950 | 1/1996 | Crivello . |
| 5,550,272 | 8/1996 | Lewis et al. . |
| 5,554,686 | 9/1996 | Frisch, Jr. et al. . |
| 5,583,178 | 12/1996 | Oxman et al. . |
| 5,691,435 | 11/1997 | Herzig et al. . |
| 5,703,163 | 12/1997 | Baum . |
| 5,811,193 | 9/1998 | Baum . |
| 6,031,012 * | 2/2000 | Nakanishi et al. . |

FOREIGN PATENT DOCUMENTS

| | | |
|---|---|---|
| 4152134 | 5/1992 | (JP) . |
| 625661 | 9/1994 | (JP) . |
| WO 95/21206 | 8/1995 | (WO) . |

OTHER PUBLICATIONS

Chemical Abstracts Service, Abstract No. 120:31419, XP002151757, "Hydrosilylation of styrene–butadien block copoymers", vol. 33, No. 2, 1992, pp. 136–137.
Chemical Abstracts Service, Abstract No. 122:216782, XP0.02151758.
Chemical Abstract Service, Abstract No. 117:214136, XP002151759.
Chemical Abstract Service, Abstract No. 96:182493, XP002151760, "Synthesis of statistical polydiene networks by reaction of liquid polyenes with telechelic siloxanes", vol. 6, No. 5–6, 1992, pp. 251–257.
Chemical Abstract Service, Abstract No. 105:134794, XP002151761, "Industrial and Engineering Chemistry Process Design and Development", vol. 25, No. 3, 1986, pp. 289–391.
Gabor et al. *Polym. Prepr.* ACS Div. Poly. Chem.) 1992, 33 (2), pp. 136–137.
*Comprehensive Organic Transformations*, 1$^{st}$ Edition, New York, 1989, p. 508.
Saunders and Frisch, *Polyurethanes: Chemistry and Technology*, vol. 16, Part I, pp. 166–169, Interscience Publishers, New York, 1963.
Rosthauser and Nachtkamp, "Waterborne Polyurethanes", *Advances in Urethane Science and Technology*, vol. 10, pp. 121–162, 1987.
Souheng Wu, *Polymer Interface and Adhesion*, Marcel Dekker Inc., p. 181, 1982.
*Modern Approaches to Wettability Theory and Application*, Plenum Press, pp. 332–333, 1992.

* cited by examiner

Primary Examiner—Robert Dawson
Assistant Examiner—Kuo-Liang Peng
(74) Attorney, Agent, or Firm—Scott R. Pribnow

(57) ABSTRACT

The present invention provides curable compositions comprising the hydrosilation product of olefin-containing polymers and organosiloxane hydrides. The curable compositions may be cured to form low surface energy cured composition which may be suitable, for example, as antifouling coatings on substrates such as boat or ship hulls.

48 Claims, No Drawings

CURABLE COMPOSITIONS COMPRISING THE HYDROSILATION PRODUCT OF OLEFIN-CONTAINING POLYMERS AND ORGANOSILOXANE HYDRIDES, CURED COMPOSITIONS MADE THEREFROM, AND METHODS OF MAKING SAME

BACKGROUND

The invention relates to curable compositions resulting from the hydrosilation of olefin-containing polymers with organosiloxane hydrides. The curable compositions may be cured to provide low surface energy cured compositions which may be provided in the form of a coating on a substrate.

Coatings having low surface energy are well known for use as automotive waxes, marine waxes and antifouling coatings. These coatings are useful because the low surface energy inhibits attachment of marine organisms and causes water to bead and to run off the surface of the coating. Silicone containing materials are known to provide low surface energy when incorporated into coatings. However, when low molecular weight silicone containing additives are used as the means of incorporating silicone into a coating, leaching of the silicone containing additive may result. Over time, this leaching leads to an increase in the surface energy of the coating and, consequently, a reduction in the performance of the coating. Silicone based polymers themselves are of little use since they typically lack the mar and abrasion resistance needed for these applications.

Theoretically, an ideal material for durable low surface energy coatings would have a strong polymer backbone with multiple silicone containing substituents grafted onto the polymer backbone at various points along its length. Gabor et al. report the hydrosilation of styrene-butadiene block co-polymers with organosiloxane monohydrides such as pentamethyldisiloxane or 1,1,1,3,3,5,5-heptamethyl trisiloxane. The resulting polymers have linear silicon-containing pendant chains (see, Gabor et al., Polym. Prepr. (ACS Div. Poly. Chem.), 1992, 33 (2), pp. 136–137). The short chain organosiloxanes monohydrides provide only a low level of silicone in the resulting polymers.

U.S. Pat. No. 5,703,163 (Baum) reports loop polymers having a polymeric backbone and a plurality of olefinic groups which have been converted to closed loops by reaction with difunctional organic compounds reactive with the olefinic groups. Although Baum incorporates a higher level of silicone into the resulting polymers, the synthetic scheme used to form loop polymers is preferably carried out at low percent solids. This limitation complicates commercial use of the resulting loop polymers as they must be recovered from a large amount of solvent in order to be useful in high solids coating formulations.

In view of the foregoing, there is a need for curable compositions having a high level of silicone chemically grafted onto a polymer backbone that can be manufactured at high solids without the formation of an solid mass and/or insoluble gel. A synthetic route that eliminates gel formation resulting from excessive crosslinking and yields a high percent solids curable composition is highly desirable.

SUMMARY

The present invention provides curable compositions and cured compositions comprising the hydrosilation product of olefin-containing polymers and organosiloxane hydrides. The curable compositions may be cured to provide cured compositions having a low surface energy (e.g., less than about 35 dynes/cm) which may be suitable for use as antifouling coatings on substrates such as boats, ship hulls or other at least partially submerged structures such as bridge pilings, docks, dams, an offshore oil rigs.

In one aspect of the present invention, a curable composition is provided comprising the hydrosilation product of:
(a) a polymer comprising a plurality of olefin groups and at least two organic functional groups; and
(b) an organosiloxane monohydride having the structure illustrated in formula (4):

(4)

wherein $R_4$ is a monovalent organosiloxane radical having the structure illustrated in formula (5):

(5)

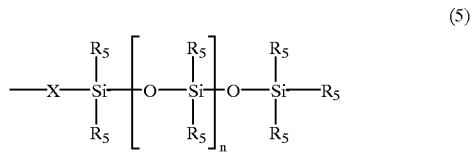

wherein n is about 10 or greater;
$R_5$ is independently selected from organic radicals, for example, $C_{1-10}$ alkyl radicals and phenyl radicals; and
X is an oxygen atom or a divalent organic linking group;
In a preferred embodiment, $R_4$ has the structure illustrated below:

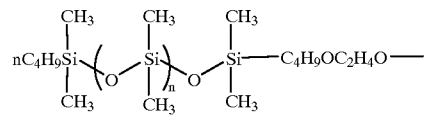

where n is about 10 or greater;
In another aspect of the present invention, a curable composition is provided comprising the hydrosilation product of:
(a) a polymer comprising a plurality of olefinic groups and at least two organic functional groups; and
(b) an organosiloxane dihydride having the structure illustrated in formula (6)

(6)

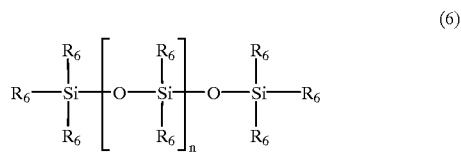

wherein the organosiloxane dihydride crosslinks the polymer and wherein the curable composition comprises about 45% weight or greater silicone.

In formula (6), n is about 200 or greater and $R_6$ is independently selected from the group consisting of $C_{1-10}$ alkyl radicals, phenyl radicals, organosiloxane radicals and hydrogen, with the proviso that two $R_6$ groups are hydrogen (i.e., a dihydride). Prior to the formation of the hydrosilation product, the ratio of the number of olefin groups in the polymer to the number of hydride groups in the organosiloxane dihydride is preferably about 20:1 or greater, more preferably about 50:1 or greater, and most preferably about 100:1 or greater. The olefin to hydride ratio is selected to provide the desired balance of crosslinking and silicone content in the curable composition.

The olefin-containing polymer used to form the curable compositions of the present invention comprise a plurality of olefin groups and at least two organic functional groups. Functional groups include, for example, hydroxyl, carboxyl, epoxy, amino, silane, silanol, and mercapto groups. In one embodiment of the present invention, the olefin-containing polymer has the structure illustrated in formula (2) where n is about 20 or greater, preferably about 50 or greater:

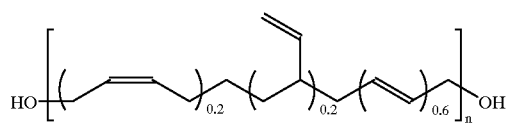

(2)

The organic functional groups of the olefin-containing polymer may be reacted with a curative in order to form cured compositions of the present invention. Suitable curatives include, for example, water, polyfunctional isocyanates, polyols, polyamines, epoxies, olefins and acetylenes. In a preferred embodiment, a curable composition of the present invention is used as the polyol component of a silanol-terminated urethane dispersion, such as those described in U.S. Pat. No. 5,554,686 (Frisch et al.) and Ser. No. 08/978,331 (Roberts et al), filed Nov. 11, 1997.

Curable compositions of the present invention preferably have a Brookfield viscosity less than about 1,000,000 cP, more preferably less than about 500,000 cP and most preferably less than about 100,000 cP and preferably comprise about 45% weight or greater silicone, more preferably about 60% weight or greater silicone, more preferably about 70% weight or greater silicone and most preferably about 80% weight or greater silicone. As used herein, "% weight silicone" refers to the combined weight of silicon and oxygen present in the form of an alternating chain of covalently bonded silicon and oxygen atoms in a curable composition of the present invention expressed as a percentage of the total weight of the curable composition.

In another aspect of the present invention, a method of making a curable composition is provided comprising the steps of:

(a) providing a plurality of polymer molecules each molecule comprising a plurality of olefin groups and at least two organic functional groups;

(b) providing an plurality of organosiloxane monohydride molecules having the structure illustrated in formula (4):

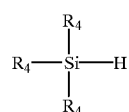

(4)

wherein $R_4$ has the structure illustrated in formula (5):

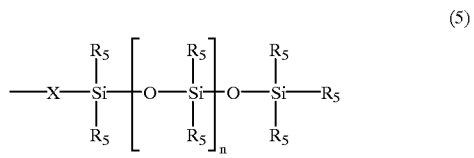

(5)

wherein n is about 200 or greater;

$R_5$ is a monovalent organic radical; and

X is an oxygen atom or a divalent organic linking group; and (c) reacting the plurality of olefin groups of the polymer with the organosiloxane monohydride to form the curable composition.

In another aspect of the present invention, a method of making a curable composition is provided comprising the steps of:

(a) providing a plurality of polymer molecules each polymer molecule comprising a plurality of olefin groups and at least two organic functional groups;

(b) providing a plurality of organosiloxane dihydride molecules having the structure illustrated in formula (6):

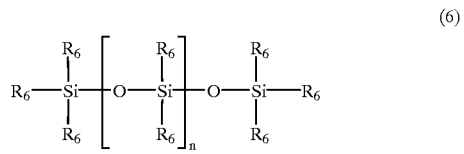

(6)

wherein n is about 200 or greater;

$R_6$ is independently selected from the group consisting of monovalent organic radicals, organosiloxane radicals and hydrogen with the proviso that at least two $R_6$ groups are hydrogen; and (c) crosslinking the polymer molecules by reacting at least a portion of the olefin groups of the polymer molecule with at least a portion of the hydride groups of the organosiloxane dihydride to form a curable composition comprising about 45% weight or greater silicone.

In one embodiment, the organosiloxane hydride and the olefin containing polymer are reacted in the presence of an hydrosilation catalyst, for example, platinum-divinyltetramethyldisiloxane. The olefin-containing polymer and the organosiloxane hydride may be reacted neat (i.e., 100% solids) or they may be dissolved in an organic solvent, preferably at a percent solids of about 45% or greater.

DETAILED DESCRIPTION

The present invention provides curable compositions comprising the hydrosilation product of an olefin-containing polymer having at least two organic functional groups and an organosiloxane hydride. The organic functional groups of the curable compositions may be reacted with a curative to form cured compositions having low surface energy. In this way, the curable compositions of the present invention may be converted to cured compositions suitable for use, for example, as antifouling coatings. The curable compositions of the present invention have a high silicone content, typically about 45% weight or greater silicone, and can be manufactured at high solids, typically about 45% solids or greater, without the formation of an insoluble gel. A high silicone content is desirable as the silicone functions to lower the surface energy of the cured compositions.

In the present invention, a curable composition is formed by reacting an olefin-containing polymer with an organosiloxane hydride according to a hydrosilation reaction. As used herein, the term "hydrosilation" refers to the chemical reaction in which a compound containing a silicon hydride (i.e., Si—H group) reacts with an olefin (i.e., a carbon-carbon double bond) to form a Si-C covalent bond. Accordingly, the term "hydrosilation product" refers to the composition resulting from a hydrosilation reaction. In the present invention, silicon hydride group(s) of the organosiloxane hydride react across the olefin groups of the olefin-containing polymer to form the curable composition. By virtue of this hydrosilation reaction, the olefin-containing polymer becomes covalently bonded to a plurality of organosiloxane substituents. The curable composition resulting from the hydrosilation reaction is typically a viscous liquid having a viscosity less than about 1,000,000 cP, preferably less than about 500,000 cP, and most preferably less than about 100,000 cP.

Curable compositions of the present invention include organic functional groups (present on the olefin-containing polymer) which may be reacted with curatives to provide a cured composition. In this way, the curable compositions may be cured to form solids suitable for use, for example, as anti fouling coatings.

Olefin-Containing Polymer

The olefin-containing polymers useful in the present invention include within their structure a plurality of olefin groups. As used herein the term "olefin group" or "olefin" refers to a carbon-carbon double bond, may be represented generally by the structure illustrated in formula (1):

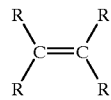

(1)

where R may be hydrogen or an organic substituent, for example, the main chain or backbone of the olefin-containing polymer. Each olefin group provides a potential site for hydrosilation. The olefin groups may be in the backbone of the olefin-containing polymer, pendent from the backbone of the polymer, or both. Pendant olefin groups are preferred as they are typically more reactive in hydrosilation than olefin groups present within the backbone of the olefin-containing polymer.

The olefin-containing polymer may comprise various polymer types, for example, polyolefins, polyesters, polyacrylates, polystyrenes and the like and may be produced by any suitable polymerization mechanism. Preferred olefin-containing polymers are tough and/or abrasion resistant or are capable of being cured to form tough and/or abrasion resistant cured compositions. Preferred cured compositions of the present invention have a tensile strength of at least about 4 mPa, more preferably at least about 7 mPa or greater when tested according to the procedure outlined herein.

Olefin-containing polymers suitable for use in the present invention contain at least two organic functional groups. As used herein the term "organic functional group" refers to a grouping of covalently bonded atoms which are capable of chemically reacting with other compounds to form covalent bonds. Examples of suitable functional groups include alcohols, carboxylic acids, amines, and isocyanates. The various functional groups of the olefin-containing polymer may be the same or may be different from one another. Preferably, the organic functional groups are alcohol groups. The presence of at least two functional groups in the olefin-containing polymer provides a means for reacting the curable composition with a curative (e.g., a chain extender or crosslinker) to increase the molecular weight and/or to crosslink the curable composition. By way of example, an olefin-containing polymer having two alcohol functional groups (i.e., a diol) may be reacted with a polyisocyanate compound in order to produce a polyurethane.

One preferred olefin-containing polymer may be represented by the structure illustrated in formula (2) and is commercially available under the trade designation "POLY bd R-45HTLO" from Elf Atochem North America, Philadelphia, Pa.

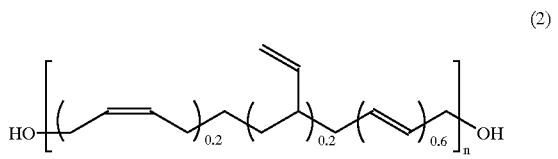

(2)

In formula (2), n is typically about 20 or greater, more preferably about 50 or greater.

Organosiloxane Hydrides

Curable compositions of the present invention may be prepared using organosiloxane monohydrides, organosiloxane dihydrides or mixtures thereof. Organosiloxane hydrides may be generally described as compounds having a backbone of covalently bonded alternating silicon and oxygen atoms wherein each silicon atom is also bonded to two substituents selected from organic radicals, organosiloxane radicals and hydrogen. An organosiloxane hydride may be represented generally by the structure illustrated in formula (3):

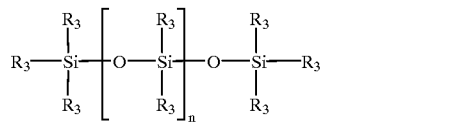

(3)

where $R_3$ is independently selected from hydrogen, organosiloxane radicals and organic radicals. Organic radicals include, for example, aliphatic (i.e., straight chain) radicals, (e.g., hydrocarbons, alcohols, ethers, aldehydes, ketones, carboxylic acids) and cyclic (i.e., closed ring) radicals (e.g., alicyclic, aromatic and heterocyclic radicals) and combinations thereof. Examples of preferred $R_3$ groups include $C_{1-10}$ alkyl radicals (e.g., methyl, ethyl, propyl), phenyl radicals, hydrogen and organosiloxane radicals. Most preferably, $R_3$ is a methyl radical or hydrogen.

In formula (3), if only one of the Si atoms is directly bonded to a hydrogen atom the compound is an organosiloxane monohydride. In formula (3), if two hydrogen atoms are bonded directly to one or more Si atoms the compound is an organosiloxane dihydride. Non-integer functionalities are also within the scope of the present invention. For example, a mixture of an organosiloxane monohydride and an organosiloxane dihydride may be described as having a non-integer functionality between 1 and 2. In formula (3), the value of "n" represents the chain length of the organosiloxane hydride and is directly proportional to its molecular weight.

Preferred organosiloxane hydrides for use in the curable compositions of the present invention are organosiloxane monohydrides. Monohydrides are preferred because they do not crosslink the olefin-containing polymer. That is, monohydrides have only one reactive hydride per molecule and, therefore, do not react to form crosslinks between individual olefin-containing polymer molecules. Limiting crosslinking in the curable composition is desirable since crosslinking increases the viscosity of the curable composition, decreases the solubility of the curable composition, and may result in the curable composition forming an insoluble gel or mass.

A preferred organosiloxane monohydride has the structure illustrated in formula (4):

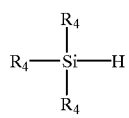
(4)

wherein $R_4$ is a monovalent organosiloxane radical having the structure illustrated in formula (5):

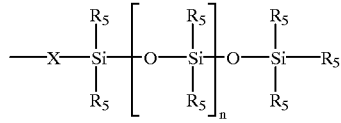
(5)

wherein n is about 10 or greater;

$R_5$ is independently selected from organic radicals, for example, aliphatic (i.e., straight chain) radicals (e.g., hydrocarbons, alcohols, ethers, aldehydes, ketones, carboxylic acids) and cyclic (i.e., closed ring) radicals (e.g., alicyclic, aromatic and heterocyclic radicals) and combinations thereof. Examples of preferred $R_5$ groups include $C_{1-10}$ alkyl radicals (e.g., methyl, ethyl, propyl) and phenyl radicals. Most preferably, $R_5$ is a methyl radical or a phenyl radical; and X is an oxygen atom or a divalent organic linking group, for example, aliphatic (i.e., straight chain) divalent radicals (e.g., hydrocarbons, alcohols, ethers, aldehydes, ketones, carboxylic acids) and cyclic (i.e., closed ring) divalent radicals (e.g., alicyclic, aromatic and heterocyclic radicals) and combinations thereof. Preferably, X is an oxygen atom or an aliphatic divalent linking group having from 2 to 10 carbon atoms.

Although not wishing to be bound by theory, it is believed the organosiloxane hydrides represented by formula (4) are particularly suitable for use in the curable compositions of the present invention because the structure of the organosiloxane hydrides of formula (4) contains three organosiloxane chains which emanate from the silicon atom which is directly bonded to a hydrogen (i.e., the silicon hydride). It is believed that this branched structure more completely conceals or covers the olefin-containing polymer than linear (i.e., straight chain) organosiloxane monohydrides. Covering the olefin-containing polymer with organosiloxane hydride groups is believed to be important in producing cured compositions having a low surface energy (e.g., less than about 35 dynes/cm) since the olefin-containing polymer alone would typically have a substantially higher surface energy.

Organosiloxane monohydride of formula (4) may be prepared, for example, by reacting 3 equivalents of a hydroxy-terminated organosiloxane with 1 equivalent of trichlorosilane ($HSiCl_3$). A preferred hydroxy-terminated organosiloxane has the structure illustrated below

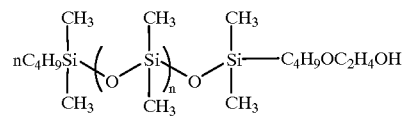

wherein n is about 10 or greater. This hydroxy-terminated organosiloxane shown above is commercially available under the trade designation "SILAPLANE FM-0411" from Chisso America Corporation, New York, N.Y.

Crosslinked curable compositions of the present invention may be formed using organosiloxane dihydrides. Suitable organosiloxane dihydrides have the structure illustrated in formula (6):

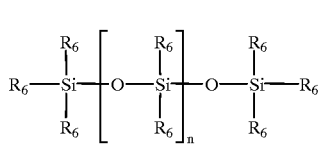
(6)

wherein n is about 200 or greater, more preferably about 400 or greater and most preferably about 600 or greater. In formula (6), $R_6$ is independently selected from monovalent organic radicals, for example, aliphatic (i.e., straight chain) radicals (e.g., hydrocarbons, alcohols, ethers, aldehydes, ketones, carboxylic acids) and cyclic (i.e., closed ring) radicals (e.g., alicyclic, aromatic and heterocyclic radicals) and combinations thereof with the proviso that at least two $R_6$ groups are hydrogen. Examples of preferred $R_6$ groups include $C_{1-10}$ alkyl radicals (e.g., methyl, ethyl, propyl), and phenyl radicals. Most preferably, $R_6$ is a methyl radical or a phenyl radical.

Organosiloxane dihydrides having n equal to about 200 or greater are preferred as these compounds result in a favorable balance of silicone content relative to crosslink density in the curable compositions of the present invention. More specifically, these relatively high molecular weight organosiloxane dihydrides result in a high weight percentage of silicone being incorporated into the curable compositions of the present invention per crosslink site. A high silicone content is generally preferred as the silicone acts to lower the surface energy of coatings formed from the curable compositions. Curable compositions of the present invention preferably comprise about 45% weight or greater silicone, more preferably about 60% weight or greater silicone, more preferably about 70% weight or greater silicone and most preferably about 80% weight or greater silicone. Coatings comprising the cured compositions of the present invention typically have a surface energy less than about 35 dynes/cm, preferably less than about 25 dynes/cm. A low level of crosslinking is preferred in curable compositions of the present invention because crosslinking affects both the viscosity and solubility of the curable compositions. If the crosslink level is too great, the reaction product may form a gel or insoluble mass. Suitable curable compositions are liquids that have a viscosity of less than about 1,000,000 cP, preferably less than about 500,000 cP and most preferably less than about 100,000 cP.

Organosiloxane hydride may be characterized by their hydride equivalent weight. As used herein "hydride equivalent weight" refers to the molecular weight of an organosiloxane hydride divided by the number of hydride groups (i.e., Si—H groups) per molecule. For example, an organosiloxane dihydride having a molecular weight of 1000 grams/mole has a hydride equivalent weight of 500 grams/mole.

A preferred organosiloxane dihydride is commercially available under the trade designation "SIVENTO H1-10000" (hydride containing polydimethylsiloxane having a hydride equivalent weight of about 7,288 grams/mole commercially available from Hüls North America, Somerset, N.J.).

Method of Making Curable Compositions

In order to make a curable composition of the present invention an olefin-containing polymer is hydrosilated with an organosiloxane hydride. In curable compositions of the present invention, the stochiometric ratio of olefin groups (present in the olefin-containing polymer) to silicon hydride groups (present in the organosiloxane hydride) prior to the hydrosilation reaction is at least about 1:1, preferably greater than about 1:1. When organosiloxane dihydrides are used, crosslinking of the olefin-containing polymer by the dihydride dictates that the stochiometric ratio of olefin groups to silicon hydride groups prior to the hydrosilation reaction be increased in order to prevent the formation of an insoluble mass or gel. For example, when dihydrides are used, the stochiometric ratio of olefin groups to silicon hydride groups is typically about 20:1 or greater, more preferably about 50:1 or greater, and most preferably about 100:1 or greater. The stochiometric ratio of olefin groups to silicon hydride groups prior to the hydrosilation reaction controls, in part, the amount of silicone incorporated into the curable composition and, for dihydrides, the level of crosslinking in the curable composition. It is understood by those of skill in the art that the desired ratio of hydride groups to olefin groups may depend upon such factors as the molecular weight of the organosiloxane hydride, the functionality of the organosiloxane hydride, and the number and type (i.e., pendant versus terminal) of olefin groups in the olefin-containing polymer.

To increase the rate of hydrosilation of the olefin-containing polymer, the hydrosilation reaction may be conducted at elevated temperature (e.g., from about 50 to 120° C.) and/or in the presence of a catalyst. Suitable catalysts include for example, platinum-divinyltertamethyldisiloxane, also known as Karstedt's catalyst (commercially available under the trade designation "SIVENTO CPC072" from Huls North Amercia, Somerset, N.J.) and platinum (II) catalysts. Karstedt's catalyst is typically added in an amount ranging from about 0.1 to about 0.5 % wt. To improve yield, hydrosilation is preferably conducted in an inert atmosphere, for example, nitrogen.

The hydrosilation reaction may be carried out neat (i.e., using undiluted reactants) or the reactants may be diluted with a suitable solvent. Examples of useful solvents include, for example, ketones, tertiary alcohols, ethers, esters, amides, hydrocarbons, chlorohydrocarbons, chlorocarbons, and mixtures thereof. Solvent may be added prior to the hydrosilation reaction or it may be added to the curable composition after the hydrosilation reaction, for example, to adjust the viscosity. Typically, the percent solids of the curable composition is at least about 45%, more preferably at least about 60% and most preferably at least about 75%. A high percent solids is preferred in order to maximize yield of the curable composition in a given reactor volume and in order to minimize the quantity of volatile organic compounds in the curable compositions in order to provide, for example, VOC compliant coating formulations. Further, high solids hydrosilation favors intermolecular reaction of organosiloxane dihydrides with the olefin-containing polymer (i.e., crosslinking) rather than intramolecular reaction of the organosiloxane dihydride with a single olefin-containing polymer.

Curatives

The curable compositions of the present invention may be cured by reaction with a curative to form a multitude of polymeric materials which are useful, for example, as antifouling coatings. For example, curable compositions of the present invention having hydroxyl groups (i.e., as the organic functional groups) may be used to prepare various types of urethane polymers such as one component moisture cure urethanes, two component urethanes, blocked two component urethanes, water-borne urethanes or silanol-terminated urethane dispersions. The synthetic routes to each of the various types of urethane polymers are well known to those of skill in the art.

Suitable curatives for curable compositions of the present invention may be selected by one of skill in the art having knowledge of the organic functional groups of the olefin-containing polymer and the desired properties of the cured composition. For example, olefin-containing polymers having alcohol functional groups may be reacted with multifunctional carboxylic acids, epoxides, or isocyanates to provide polyesters, polyethers or polyurethanes, respectively. Olefin-containing polymers having carboxyl functional groups may be reacted with curatives such as multifunctional alcohols, amines or thiols to provide polyesters, polyamides or polythioesters, respectively (see, *Comprehensive Organic Transformations*, $1^{st}$ Edition, New York, 1989, pp. 445 and 996 and *Polyurethanes: Chemistry and Technology* Part I (1963) and Part II (1964), New York). Olefin-containing polymers having epoxide functional groups may be reacted with curatives such as multifunctional carboxyls, alcohols, amides or amines to provide polyesters, polyethers, polycarboamines or polyamides, respectively (see, *Comprehensive Organic Transformations*, $1^{st}$ Edition, New York, 1989, p. 508). Olefin-containing polymers having amine functional groups may be reacted with multifunctional carboxylic acids or isocyanates to provide polyamides or polyureas, respectively (see, *Comprehensive Organic Transformations*, $1^{st}$ Edition, New York, 1989, p. 972 and *Polyurethanes: Chemistry and Technology* Part I (1963) and Part II (1964), New York). Olefin-containing polymers having silane functional groups may be reacted with compounds containing vinyl groups or compounds containing acetylinic groups to provide polycarbosilanes or polyvinylsilanes, respectively (see, *Comprehensive Handbook of Hydrosilation*, $1^{st}$ Edition, New York, 1992, pp. 11–12).

In some instances water may be selected as the curative. For example, if the organic functional groups of the olefin-containing polymer are isocyanate groups, water may be used in a moisture-cure mechanism to cure the curable composition. Optionally, olefin-containing polymers having alcohol or amine functional groups may be chain extended with a multifunctional isocyanate to provide a moisture curable composition. The resulting moisture-curable composition may be cured by exposure to water including, for example, suitable levels of atmospheric humidity.

A preferred curative for the curable compositions of the present invention having amine and/or alcohol organic functional groups is a polyisocyanate. Polyisocyanates comprise compounds having two isocyanate groups (i.e., diisocyanates and/or adducts thereof) and may optionally comprise compounds having greater than two isocyanate groups (e.g., triisocyanates and/or adducts thereof). Adducts of the polyisocyanate compounds as defined herein refer to isocyanate functional derivatives of polyisocyanate compounds and polyisocyanate prepolymers. Examples of adducts include but are not limited to ureas, biurets, allophanates, dimers and trimers of isocyanate compounds, uretidinediones, and mixtures thereof. Any suitable organic polyisocyanate, such as an aliphatic, cycloaliphatic, araliphatic or aromatic polyisocyanate, may be used either singly or in mixtures of two or more. The aliphatic isocyanates provide generally better light stability than the aromatic isocyanates. Aromatic polyisocyanates, on the other hand, are generally more economical and are more reactive toward polyols and other active hydrogen compounds than aliphatic polyisocyanates.

Suitable aromatic polyisocyanates include but are not limited to 2,4-toluene diisocyanate, 2,6-toluene diisocyanate, a dimer of toluene diisocyanate (commercially available under the trade designation "DESMODUR TT" from Miles Coating Division), diphenylmethane 4,4'-diisocyanate (MDI), 1,5-diisocyanato-naphthalene, 1,4-phenylene diisocyanate, 1,3-phenylene diisocyanate, and mixtures thereof.

Examples of useful cycloaliphatic polyisocyanates include but are not limited to dicyclohexylmethane diisocyanate ($H_{12}$MDI, commercially available under the trade designation "DESMODUR W" from Miles Coating Division), isophorone diisocyanate (IPDI), 1,4-cyclohexane diisocyanate (CHDI), 1,4-cyclohexanebis(methylene isocyanate) (BDI), 1,3-bis(isocyanatomethyl)cyclohexane ($H_6$XDI), and mixtures thereof.

Examples of useful aliphatic polyisocyanates include but are not limited to hexamethylene 1,6-diisocyanate (HDI), 1,12-dodecane diisocyanate, 2,2,4-trimethyl-hexamethylene diisocyanate (TMDI), 2,4,4-trimethyl-hexamethylene diisocyanate (TMDI), 2-methyl-1,5-pentamethylene diisocyanate, dimer diisocyanate, the urea of hexamethyl diisocyanate, and mixtures thereof.

Examples of useful araliphatic polyisocyanates include but are not limited to m-tetramethyl xylylene diisocyanate (m-TMXDI), p-tetramethyl xylylene diisocyanate (p-TMXDI), 1,4-xylylene diisocyanate (XDI), and 1,3-xylylene diisocyanate, and mixtures thereof.

Preferred polyisocyanates, in general, include isophorone diisocyanate, toluene diisocyanate, dicyclohexylmethane 4,4'-diisocyanate, MDI, derivatives of all the aforementioned, and mixtures thereof.

Polyisocyanates or polyisocyanate adducts containing more than two isocyanate groups in the molecule can be included to introduce branching into the prepolymer which enhances the solvent resistance, water resistance and hardness of coatings made from these polyurethane dispersions; however, a predominance of diisocyanates is required. Limited amounts of polyisocyanates containing greater than 2 isocyanate groups can be employed. Typical isocyanates from this group include but are not limited to triphenylmethane 4,4,4"-triisocyanate, tris-(4-isocyanatophenyl)-thiophosphate, fluorinated and/or silicone containing derivatives of the aforementioned and the like. Similarly, limited amounts of polyisocyanate adducts containing more than two isocyanate groups can be employed, including but not limited to those selected from the group consisting of trimer of isophorone diisocyanate (commercially available under the trade designation "POLYISOCYANATE IPDI-T 1890" from Hüls America), and trimer of HDI (commercially available under the trade designation "DESMODUR N3300" from Miles Polymer Division), trimer of m-tetramethylxylene diisocyanate (a trifunctional polyisocyanate adduct of trimethylolpropane and m-tetramethylxylene diisocyanate commercially available under the trade designation "CYTHANE 3160" from American Cyanamid Co.).

In addition, blocked polyisocyanates made from the above can be used. A blocked polyisocyanate can be prepared by reacting one of the above polyisocyanates with a blocking agent. Typical isocyanate blocking agents include but are not limited to phenol, nonyl phenol, methyl ethyl ketoxime, sodium bisulfate, and ε-caprolactam. These blocked prepolymers can be used in conjunction with diamines or diamine precursors such as ketamines.

For curable compositions which rely upon the reaction of an isocyanate group with an active hydrogen compound (e.g., an alcohol or amine) a catalyst may optionally be added. Examples of useful catalysts include tin II and tin IV salts such as stannous octoate and dibutyltin dilaurate, respectively, tertiary amine compounds such as triethyl amine and bis(dimethylaminoethyl) ether, morpholine compounds such as $\beta,\beta'$-dimorpholinodiethyl ether, bismuth carboxylates, zinc-bismuth carboxylates, iron (III) chloride, potassium octoate, and potassium acetate. Examples of other useful catalysts may be found in *Polyurethanes: Chemistry and Technology*, Part I, Table 30, Chapter 4, Saunders and Frisch, Interscience Publishers, New York, 1963. Depending on reaction conditions (e.g., cure temperature and/or isocyanate reactivity), a catalyst at the level of up to about 0.5 percent by weight of the curable composition, typically about 0.00005 to about 0.5 percent by weight of the curable composition may be used.

Silanol-Terminated Urethane Dispersions

Another route for curing the curable compositions of the present invention involves the formation of a silanol-terminated urethane dispersion using a curable composition of the present invention as one of the components thereof. The silanol-terminated urethane dispersion may then be converted to a cured composition by application of heat, optionally in the presence of a crosslinker. Silanol-terminated urethane dispersions are reported, for example, in U.S. Pat. No. 5,554,686 (Frisch et al.) and in U.S. Ser. No. 08/978,331 (Roberts et al.), filed Nov. 11, 1997.

The following is a general method of making a silanol-terminated urethane dispersion. A polyurethane prepolymer is prepared in the first step of the process. To a reactor equipped with a stirrer, a heater, and a dry gas purge (for example, nitrogen, argon, etc.), the polyisocyanate component is added to the reactor with optional coalescing solvent and optional dry solvent (c.g., anhydrous methylethyl ketone, having $H_2O$ levels of 0.05% or less). The reactor is heated to the reaction temperature (generally from about 20° C. to about 100° C.) and the polyol component, optional catalyst, and the water solubilizing compound is added slowly, keeping the reaction exotherm below 100° C. to minimize unwanted side reactions. Suitable polyols include the curable compositions of the present invention having at least two alcohol functional groups. Optionally all or a portion of the chain extender component and the isocyanate reactive silane compound can be added at this point. If such optional compounds are included, then the isocyanate groups on the chain extender and silane should not contain large amounts of a primary amine because there can be an unacceptable viscosity increase in the prepolymer which could make the dispersion step in water difficult. If the ratio of NCO:OH is less than 2:1, it may be desirable to prepare the hard segment (chain extender, water dispersing compound) followed by the soft segment (polyol).

As the polyurethane prepolymer is made, additional chain extender and polyisocyanate components can optionally be incorporated into the reaction mixture. The reaction is then allowed to proceed until the desired excess on an isocyanate equivalent basis of about 1.4 to about 4 times the combined active hydrogen equivalent as contributed by the polyol component, the water solubilizing compound, and optional chain extender component and isocyanate reactive silane compound is achieved.

Optionally the salt forming compound can be added to this polyurethane prepolymer reaction mixture. If the salt forming compound is added, care should be taken to reduce the temperature and/or disperse the polyurethane prepolymer in the water phase shortly after this addition. The product of the salt forming compound with the water-solubilizing compound can produce a salt which may in some cases catalyze an unwanted side reaction. This side reaction could result in an undesired viscosity increase making the dispersion step difficult. This rise in viscosity can be minimized or avoided by taking the precautions listed above. Optional solvent can be added at this point to modify the viscosity and/or enhance the processability of the polyurethane prepolymer. The viscosity of the prepolymer should be low enough (about 70,000 cP or less) to facilitate the dispersion step.

The second step is to typically make a water phase. The water phase typically comprises water, the salt forming compound, and all or the remainder of the chain extender component and the isocyanate reactive silane compound. Deionized water is used to prevent instability and agglomeration of the polyurethane prepolymer when it is subsequently dispersed into the water phase. Primary amine functional chain extenders and isocyanate reactive silane compounds are preferred in the water phase due to their relatively rapid reactivity with the isocyanate groups of the polyurethane prepolymer. If the final amount of the chain extender component, isocyanate reactive silane compound or salt forming compound has been added previously to the prepolymer, then they need not be added to the water phase. If partial additions of these components and compounds have occurred in the prepolymer, the remaining material may be added to the water phase, assuming compatibility with the water can be achieved, i.e., the components are either water soluble or water dispersible. The pH of the water phase is then measured to assure that the dispersion will be stable. An anionic dispersion is adjusted to achieve a pH of about 7 or higher, preferably a pH of about 8 or more.

The third step is to disperse the polyurethane prepolymer of the first step into the water phase of the second step. The water phase is added to the holding tank of a homogenizer and sufficient air pressure is supplied to pump the water phase through the homogenizer's high shear rotor. The polyurethane prepolymer is slowly injected into the circulating water phase just prior to the high shear rotor. Care should be taken not to inject material too quickly. The dispersed material is then transferred back into the water phase holding tank. On the average two or three passes through the homogenizer typically yields a mean particle size in the range of about 0.06 to about 3.0 microns. However, particle size can vary with equipment, viscosity, presence of solvent temperature, etc. The particle size can be controlled by the viscosity of the first step. The higher the viscosity, generally the larger the particle size.

Introduction of solvents into the polyurethane prepolymer reaction mixture will have the result of lowering the particle size. If such an optional solvent was introduced, e.g., methyl ethyl ketone, the final step would be to strip off the unwanted solvent. This can be accomplished using a wiped film evaporator which applies heat and vacuum to a thin film of the material efficiently stripping off the solvent. Under laboratory conditions, a Haake Rotoevaporator or other similar equipment can be used to remove the solvent.

Solvents may be required to promote the coalescence of the silanol-terminated polyurethane particles of the dispersion to form a continuous film. Examples of such coalescing solvents for use in the dispersion include but are not limited to n-methyl pyrrolidinone (NMP), n-butyl acetate, dimethyl formamide, toluene, methoxypropanol acetate (PM acetate), dimethyl sulfoxide (DMSO), ketones, alcohols, dimethyl acetamide, and mixtures thereof.

One or more additives may optionally be added to the curable compositions of the present invention including, for example, crosslinking agents, thixotropic agents, biocides, adhesion promoters (e.g., silane adhesion promoters), corrosion inhibitors, pigments, colorants, photostabilizers, antioxidants, organic toxin antifouling agents, and inert low toxicity leachable, antifouling agents such as silicone fluid. Additives such as plasticizers may also be added to increase elasticity.

To enhance the moisture resistivity of a silanol-terminated urethane dispersions about 0 to about 5 percent by weight of a crosslinking agent, preferably about 2 to about 5 percent by weight, based upon the total weight of the dispersion (or composition), may be added. These crosslinkers improve water resistance by reacting with the carboxyl groups of the silanol-terminated urethane dispersion. Use of polyfunctional aziridines or carbodiimides as crosslinking agents for waterborne urethanes is described by J. W. Rosthauser and K. Nachtkemp ("Waterborne Polyurethanes," *Advances in Urethane Science and Technology*—Vol. 10, ed. K. C. Frisch and D. Klempner, Technomics, 1987, p. 121–162). Waterborne epoxies and oxazolines also have been used as crosslinking agents for waterborne urethanes. These crosslinkers are added just prior to application of the coating to the substrate, and have an associated pot life.

Optional Additives

Antifouling agents may be added to the curable compositions of the present invention for applications where enhanced resistance to marine fouling agents is desired. Examples of useful metallic antifouling agents include, but are not limited to those selected from the group consisting of copper, cuprous oxide, organocopper compounds, organotin compounds, and organozinc compounds such as zinc-2-pyridinethiol-1-oxide (available as Zinc Omadine, from Olin Chemicals). Examples of useful organic antifouling agents include, but are not limited to, those selected from the group consisting of 2,4,5,6-tetrachloroisophthalonitrile (Nopcocide N-96, from Henkel Corporation) and 4,5-dichloro-2-n-octyl-4-isothiazolin-3-one (Sea Nine 211, from Rohm and Haas Company).

Leachable additives, commonly used in silicone fouling release coatings such as silicone fluids, may also be added to enhance performance. These materials are relatively nontoxic, and function by slowly coming to the surface of the coating, creating a weak surface layer to which marine suitable fouling organisms cannot adhere. These materials are typically based on polydimethylsiloxane. Other plasticizers or fluids that slowly leach to the surface may also be suitable. Leachable additives are discussed also in U.S. Pat. No. 5,298,060.

Other useful additives which may be incorporated into the curable compositions of the present invention include defoaming agents such as those commercially available under the trade designations "SURFYNOL DF 110L" (a high molecular weight acetylenic glycol nonionic surfactant available from Air Products & Chemicals, Inc.), "SWS-211" (a polydimethylsiloxane aqueous emulsion, available from Wacker Silicone Corp.), and "DEHYDRAN 1620" (modified polyol/polysiloxane adducts available from Henkel Corp.); mar aids commercially available under the trade designations "BYK 301", "BYK 321" and "BYK 341" (polyether modified polydisiloxane copolymers, from Byk Chemie); flow and leveling agents commercially available under the trade designations "IEPAL CO-630" (an ethoxylated nonylphenol nonionic surfactant available from Rhone-Poulenc Surfactant & Specialty Div.), "SURFYNOL 104H" (a nonionic surfactant comprising a solution of tetramethyl decynediol in ethylene glycol available from Air Products & Chemicals, Inc.), "SLRFYNOL 465" (an ethoxylated tetramethyl decynediol nonionic surfactant available from Air Products & Chemicals, Inc.), "FLUO-RAD FC-129" (a potassium fluorinated alkyl carboxylate anionic surfactant), "FLUORAD FC- 171" (a fluorinated alkyl alkoxylate nonionic surfactant), and "FLUORAD FC-430" (a fluorinated alkyl ester nonionic surfactant) ("FLURORAD" surfactants are commercially available from Minnesota Mining and Manufacturing Co., St. Paul, Minn.), and "REXOL 25/9" (an alkyl phenol ethoxylate nonionic surfactant available from Hart Chemical Ltd.); coalescing solvents to assist in film formation; thickening agents such as the associative thickeners commercially available under the trade designations "ACRYSOL ASE-60", "ACRYSOL RM-825", "ACRYSOL TT-935" and "ACRYSOL 615" ("ACRYSOL" is commercially available from Rohm and Haas Co.); and photostabilizers including but not limited to ultraviolet light stabilizers commercially available under the trade designations "TINUVIN 144" (a hindered amine photostabilizer), "TINUVIN 292" (a hindered amine photostabilizer) and "TINUVIN 328" (an ultraviolet absorber) from Ciba-Geigy Ltd. For dispersions or compositions of the present invention which are often subject to intense UV exposure (such as marine coatings), at least about 0.1 percent by weight of a photostabilizer such as ultraviolet light stabilizer can be used to inhibit and retard the yellowing and photodegradation of such formulations, typically about 0.1 to about 10 percent by weight, preferably about 1 to about 10 percent by weight, based upon the total weight of the curable composition.

Curable compositions of the present invention for use as ultraviolet (UV) stabilized coatings (e.g., marine finishes) can be formulated to retard the effects of UV degradation by selecting aliphatic isocyanates (e.g., isophorone and bis(cyclohexyl)diisocyanate ($H_{12}MDI$)) with UV stabilizers and antioxidants.

The curable compositions of the present invention may be coated on a substrate by conventional methods such as spray, roll, brush, knife, curtain, etc. Coating cure time is temperature and thickness dependent but typically ranges from several minutes to several days.

EXAMPLES

Test Methods

The following test methods were used herein.

Contact Angles

Contact angles were measured by dipping entire glass slide in the subject coating and allowing the coating to dry seven days at 22° C. and 50% relative humidity. The values were based on deionized water, as measured with equipment for measuring contact angles commercially available from AST Products, Billerica, Mass. under the trade designation VCA 2500 Video Contact Angle System.

Surface Energy

A coated glass slide was prepared as described above. Surface energies were calculated using the software provided with the VCA Video Contact Angle System (Geometric Mean Method). Reported values are the average of the surface energy calculated from the contact angles of the testing liquids water/formamide and water/methylene iodide pairs. Combining the geometric-mean equation with Young's equation gives:

$$(1+\cos \Theta_1)\gamma_1 = 2[(\gamma_1^d \gamma_s^d)^{1/2} + (\gamma_1^p \gamma_s^p)^{1/2}] \quad \text{equation 1}$$

$$(1+\cos \Theta_2)\gamma_2 = 2[(\gamma_2^d \gamma_s^d)^{1/2} + (\gamma_2^p \gamma_s^p)^{1/2}] \quad \text{equation 2}$$

where the superscripts 1 and 2 refer to the testing liquids 1 and 2, respectively, which may be, for example, water and formamide. When two testing liquids of known surface tension, $\gamma$, and its components are used to measure the contact angle, $\Theta$, equation 1 and 2 can be solved simultaneously to give $\gamma_s^d$ and $\gamma_s^p$. These are the dispersion and polar components of solid surface tension as reported in *Polymer Interface and Adhesion*, p. 181, Marcel Dekker Inc., 1982.

Immersion Weight Gain Test

An approximately 1.6 mm thick wet film of the coating was poured onto 5491 PTFE Extruded Film Tape attached to an aluminum panel substrate. The coating was allowed to dry and cure for seven days at 22° C. and 50% relative humidity. The resulting dry film was approximately 0.4 mm thick. A portion of the film was cut out (approximately 2.5 cm×2.5 cm) and weighed ($w_1$) on an electronic balance capable of +/− 0.001 gram accuracy. The specimen was then immersed in deionized water for seven days at 22° C. The specimen was then removed, patted dry with a paper towel, and quickly reweighed ($w_2$) before significant drying could take place. The % weight gain was calculated as follows:

$$\% \text{ gain} = (w_2 - w_1) \times 100 / w_1$$

A film comprising a cured compositions of the present invention preferably has a water weight gain less than 15% when subjected to the immersion weight gain test, preferably less than 10%, and most preferably less than 5%.

Tensile and Elongation

Films were prepared as noted above under "Immersion Weight Gain Test". Testing was performed on a Sintech Model 6W tensile tester. Testing was performed according to a modification of American Society for Testing and Materials (ASTM) Test Method D412–87. Samples were prepared according to Method A (dumbbell and straight specimens). Dumbbell specimens approximately 0.318 cm (0.125 inch) in width and approximately 0.4 mm (0.016 inch) in thickness were tested at a crosshead speed of 5.08 cm/min (2 inches/min).

Advancing and Receding Contact Angles

These tests were run by dipping a glass rod (2 mm diameter, 55 mm long) in the subject coating and allowing the coating to dry three days at 22 degrees C. and 50% relative humidity. The coated rods were then force dried at 48.9 degrees C., then immersed in deionized water for 7 days at 22 degrees C., followed by another dry cycle of one day at 48.9 degrees C. Advancing and receding contact angles were determined in water (OmniSolv Water WX0004-1 from EM Science, 480 S. Democrat Rd, Gibbstown, N.J. 08027) using a Cahn Instruments DCA System at a speed of 80.00 microns/sec and an immersion depth of 8 mm. Values reported are the mean of three measurements. The DCA System is commercially available from Cahn Instruments, 5225 Verona Road, Bldg. 1, Madison, Wis. 53711–4495. A description of dynamic contact angles is found in *Modern Approaches to Wettability Theory and Application*, p.332–333, Plenum Press, 1992.

Epoxy Adhesion

Measurements were made on films prepared on aluminum panels and cured as in the tensile test described above. Five one gram (+/−0.1 grams) masses of 3M Scotch-Weld™ DP-110 Gray Epoxy Adhesive were applied on the film using a 3M Type DM 200-01-B applicator. The epoxy was allowed to cure three days at 22 degrees C. and 50% humidity. Tests were run using a mechanical force gauge, Model MF-50LB from Controls International of Lincolnwood, Ill. The epoxy masses were pushed off the film in shear by holding the force gauge as parallel to the coated panel as possible. The force required to remove the epoxy mass was recorded and the average of five trials reported.

Brookfield Viscosity

Brookfield viscosity measurements of the curable compositions of the present invention were taken according to a modification of American Society for Testing and Materials (ASTM) Test Method D 4878-93 and are reported in centipoise (cP). The samples were conditioned in a constant temperature room at 25° C. prior to taking the measurements using a Brookfield RVF Viscometer. The spindle and spindle rotational speed were selected to give a mid-range reading on the viscometer scale.

| Materials | |
|---|---|
| AR toluene | analytical grade toluene |
| DBTDL | dibutyltin dilaurate commercially available from Aldrich Chemical Company, Milwaukee, WI as catalog number 29,123-4. |
| DES W | 4,4-cycohexylmethyl diisocyanate commercially available from under the trade designation "DESMODUR W" from Bayer Performance Products Division, Pittsburgh, PA. |
| DMPA | 2,2-bis(hydroxymethyl)propionic acid commercially available from Aldrich Chemical Company Milwaukee, WI. |
| DMS-H21 | Hydride terminated polydimethlylsiloxane, approximately 6000 molecular weight, available from Gelest, Inc., of Tullytown, PA. |
| DMS-H25 | Hydride terminated polydimethlysiloxane, approximately 17,200 molecular weight, available from Gelest, Inc., Tullytown, PA. |
| DMS-H41 | Hydride terminated polydimethylsiloxane, approximately 62,700 molecular weight, available from Gelest, Inc., Tullytown, PA. |
| DMS-HO3 | Hydride terminated polydimethlysiloxane, 400–500 molecular weight, available from Gelest, Inc, Tullytown, PA. |
| DYNASYLAN 1110 | N-methyl-3-aminopropyltrimethoxysilane from Huls America Inc., Piscataway, NJ. |
| EDA | ethylene diamine commercially available from Aldrich Chemical Company Milwaukee, WI. |
| EPI-REZ 3510-W-60 | Nonionic aqueous dispersion of a Bisphenol A resin with an equivalent weight of 187. The nonvolatile content is 60% by weight. Available from Shell Chemical Company of Houston, TX. |
| NMP | N-methyl-2-pyrrolidone commercially available from ISP Technologies, Inc. Wayne, NJ (manufacturer of GAF Chemicals). |
| PLATINUM CATALYST | 10% wt on activated carbon available from Aldrich Chemical Co., Milwaukee, WI, as catalog number 20,595B. |
| POLY bd R-45HTLO | hyrdroxy terminated butadiene polymer from Elf Atochem North America of Philadelphia, PA. R45HTLO is a purified version of R45HT with a lower level of volatile components. The -OH functionality is given be the vendor to be 2.4-2.6, and the hydroxyl equivalent weight is typically 1164 grams. 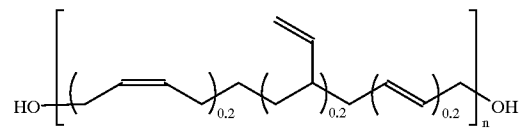 where n is about 50 |
| SILAPLANE FM-0411 | hydroxy terminated organosiloxane having the following structure: 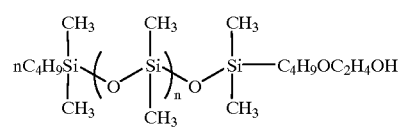 Commercially available from Chisso America Corporation, New York, NY. |
| SIVENTO CPC072 | platinum-divinyltetramethyldisiloxane complex, 5% weight concentration in xylene. Also known as "Karstedt's Catalyst". Commercially available from Huls North America of Somerset, NJ. |
| SIVENTO H1-10000 | hydride containing polydimethylsiloxane having a hydride |

-continued

| Materials | |
|---|---|
| | equivalent weight of 7,288 grams and a MeH content of 1.0 mole percent. Commercially available from Hüls North America of Somerset, NJ. |
| SIVENTO H35-25 | hydride containing polydimethylsiloxane having a hydride equivalent weight of 204 grams and a MeH content of 30–35 mole percent. Commercially available from Hüls North America of Somerset, NJ. |
| SIVENTO H50-15 | hydride containing polydimethylsiloxane having a hydride equivalent weight of 132 grams and a MeH content of 50–55 mole percent. Commercially available from Hüls North America of Somerset, NJ. |
| TEA | triethylamine commercially available from Aldrich Chemical Company, Milwaukee, WI. |
| TMEDA | tetramethylethylenediamine commercially available from Aldrich Chemical Company of Milwaukee, WI. |
| 5491 PTFE Extruded Film Tape | polytetrafluoroethylene pressure sensitive adhesive tape commercially available from Minnesota Mining and Manufacturing Company, St. Paul, MN under the trade designation "5491 PTFE Extruded Film Tape." |

Example 1

Hydrosilation of Poly bd R-45HTLO with hydride containing silicone (unsaturation:hydride ratio of approximately 50: 1).

Hydrosilation was carried out in a one liter reaction flask equipped with a heating mantle, condenser, stirring blade, nitrogen inlet, and thermometer equipped with a controller to regulate temperature. Poly bd R45HTLO, 43.54 grams (0.806 equivalents), Sivento H1-10000, 109.46 grams (0.0150 equivalents), AR(analytical grade) toluene, 150 grams, and Sivento CPC072 (0.015 grams) were heated with stirring with a nitrogen atmosphere to 85° C. and allowed to react for 48 hours. The resulting curable composition was a viscous liquid. Subsequent NMR analysis showed that 50% of the hydride had reacted.

Comparative Example A

Hydrosilation of Poly bd R-45HTLO with hydride containing silicone (unsaturation:hydride ratio of approximately 5.0:1):

Hydrosilation was carried out in a one liter reaction flask equipped with a heating mantle, condenser, stirring blade, nitrogen inlet, and thermometer equipped with a controller to regulate temperature. Poly bd R45HTLO, 85.44 grams (1.582 equivalents), Sivento H35-25, 64.56 grams (0.316 equivalents), AR toluene, 150 grams, and Sivento CPC072 (0.015 grams) were heated with stirring with a nitrogen atmosphere to 85° C. and allowed to react for 48 hours. The resulting mixture gelled and was not evaluated further.

Comparative Example B

Hydrosilation of Poly bd R-45HTLO with hydride containing silicone (unsaturation:hydride ratio of approximately 15.0:1):

Hydrosilation was carried out in a one liter reaction flask equipped with a heating mantle, condenser, stirring blade, nitrogen inlet, and thermometer equipped with a controller to regulate temperature. Poly bd R45HTLO, 128.99 grams (2.389 equivalents), Sivento H50-15, 21.01 grams (0.159 equivalents), AR toluene, 150 grams, and Sivento CPC072 (0.015 grams) were heated with stirring with a nitrogen atmosphere to 85° C. and allowed to react for 48 hours. The resulting mixture gelled and was not evaluated further.

Comparative Example C

Hydrosilation of Poly bd R-45HTLO with hydride containing silicone (unsaturation:hydride ratio of approximately 10.0:1):

Hydrosilation was carried out in a one liter reaction flask equipped with a heating mantle, condenser, stirring blade, nitrogen inlet, and thermometer equipped with a controller to regulate temperature. Poly bd R45HTLO, 85.44 grams (1.582 equivalents), Sivento H35–25, 32.25 grams (0.158 equivalents), AR toluene, 150 grams, and Sivento CPC072 (0.015 grams) were heated with stirring with a nitrogen atmosphere to 85° C. and allowed to react for 48 hours. The resulting mixture gelled and was not evaluated further.

Comparative Example D

Hydrosilation of Poly bd R-45HTLO with hydride containing silicone (unsaturation:hydride ratio of approximately 25.1:1):

Hydrosilation was carried out in a one liter reaction flask equipped with a heating mantle, condenser, stirring blade, nitrogen inlet, and thermometer equipped with a controller to regulate temperature. Poly bd R45HTLO, 130.3 grams (2.413 equivalents), Sivento H35–25, 19.59 grams (0.096 equivalents), AR toluene, 150 grams, and Sivento CPC072 (0.015 grams) were heated with stirring with a nitrogen atmosphere to 85° C. and allowed to react for 48 hours. The resulting mixture gelled and was not evaluated further.

Example 2

Silanol-Terminated urethane dispersion from polyol of Example 1:

A prepolymer was made in a one liter reaction flask equipped with a heating mantle, condenser, stirring blade, nitrogen inlet, and thermometer equipped with a controller to regulate temperature. Desmodur W, 39.69 grams (0.3029 equivalents), polyol of Example 1, 188.17 grams (0.0202 equivalents), DMPA, 8.81 grams (0.1313 equivalents), NMP. 42.6 grams were heated with stirring to 50–60° C. Next, DBTDL, 0.04 grams, was added and the mixture was heated to 80° C. and allowed to react for four hours.

A premixture was made with 292.23 grams of distilled water, 3.37 grams of TEA, 2.23 grams of EDA, and 1.77 grams of Dynasylan 1110. The prepolymer, 160.0 grams (0.085 equivalents) was added over 10 minutes to the premixture solution in a Microfluidics Homogenizer Model #HC-8000 at an air line pressure of 0.621 MPa. A stable dispersion was formed.

Example 3

Cured film prepared from the silanol-terminated urethane dispersion of Example 2:

A cured film of the dispersion of Example 2 was made as follows: 1% by weight of Shell Epi-Rez™ 3510-W60 epoxy dispersion in water was added and mixed until a homogeneous fluid was obtained. An approximately 1.6 mm thick wet film of the liquid was poured onto 3M™ PTFE Extruded Film Tape attached to an aluminum panel substrate. The coating was allowed to dry and cure for seven days at 22° C. and 50% relative humidity. The resulting dry film was approximately 0.4 mm thick. Data obtained from the cured film is shown in Table 1.

TABLE 1

PROPERTIES OF CURED FILM OF EXAMPLE 1

| | |
|---|---|
| Contact Angle: | 103.3 degrees |
| Surface Energy | 23.4 dynes/cm |
| Tensile Strength: | 7.80 mPa |
| Elongation: | 80.7% |
| Epoxy Adhesion: | 3.0 kg |
| Water Weight Gain: | 5.7% |
| Advancing Contact Angle: | 134.0 degrees |
| Receding Contact Angle: | 101.5 degrees |

Comparative Example E

Hydrosilation of Poly bd R-45HTLO with hydride terminated silicone (olefin/hydride ratio of approximately 25:1):

Hydrosilation was carried out in a one liter reaction flask equipped with a heating mantle, condenser, stirring blade, nitrogen inlet, and thermometer equipped with a controller to regulate temperature. Poly bd R45HTLO, 192.85 grams (3.571 equivalents), Gelest DMS-HO3, 32.13 grams (0.1428 equivalents), AR toluene, 75 grams, and platinum catalyst (10% on activated carbon), 1.5 grams, were heated with stirring with a nitrogen atmosphere to 85° C. and allowed to react for 48 hours. The resulting mixture gelled and was not evaluated further.

Comparative Example F

Hydrosilation of Poly bd R-45HTLO with hydride terminated silicone with an olefin/hydride ratio of approximately 50:1:

Hydrosilation was carried out in a one liter reaction flask equipped with a heating mantle, condenser, stirring blade, nitrogen inlet, and thermometer equipped with a controller to regulate temperature. Poly bd R45HTLO, 106.57 grams (1.974 equivalents), Gelest DMS-H21, 118.50 grams (0.0395 equivalents), AR toluene, 75 grams, and platinum catalyst (10% on activated carbon), 1.5 grams, were heated with stirring with a nitrogen atmosphere to 85° C. and allowed to react for 48 hours. The resulting mixture gelled and was not evaluated further.

Comparative Example G

Hydrosilation of Poly bd R-45HTLO with hydride terminated silicone with an olefin/hydride ratio of approximately 150: 1:

Hydrosilation was carried out in a one liter reaction flask equipped with a heating mantle, condenser, stirring blade, nitrogen inlet, and thermometer equipped with a controller to regulate temperature. Poly bd R45HTLO, 109.13 grams (2.021 equivalents), Gelest DMS-H25, 115.80 grams (0.0135 equivalents), AR toluene, 75 grams, and platinum catalyst (10% on activated carbon), 1.5 grams, were heated with stirring with a nitrogen atmosphere to 85° C. and allowed to react for 48 hours. The resulting mixture gelled and was not evaluated further.

Example 4

Hydrosilation of Poly bd™R-45HTLO with hydride terminated silicone with an olefin/hydride ratio of approximately 100:1:

Hydrosilation was carried out in a one liter reaction flask equipped with a heating mantle, condenser, stirring blade, nitrogen inlet, and thermometer equipped with a controller to regulate temperature. Poly bd R45HTLO, 33.06 grams (0.612 equivalents), Gelest DMS-H41, 191.9 grams (0.00612 equivalents), AR toluene, 75 grams, and platinum catalyst (10% on activated carbon), 1.5 grams, were heated with stirring with a nitrogen atmosphere to 85° C. and allowed to react for 48 hours. The resulting mixture was a liquid with a viscosity of 54,000 cP.

Example 5

Hydrosilation of Poly bd R-45HTLO with hydride terminated silicone with an olefin/hydride ratio of approximately 150:1:

Hydrosilation was carried out in a one liter reaction flask equipped with a heating mantle, condenser, stirring blade, nitrogen inlet, and thermometer equipped with a controller to regulate temperature. Poly bd R45HTLO, 45.20 grams (0.837 equivalents), Gelest DMS-H41, 178.80 grams (0.00570 equivalents), AR toluene, 75 grams, and Sivento CPC072, 1.0 grams, were heated with stirring with a nitrogen atmosphere to 85° C. and allowed to react for 48 hours. The resulting mixture was a liquid with a viscosity of 940,000 cP.

Example 6

Hydrosilation of Poly bd R-45HTLO with hydride terminated silicone with an olefin/hydride ratio of approximately 250:1:

Hydrosilation was carried out in a one liter reaction flask equipped with a heating mantle, condenser, stirring blade, nitrogen inlet, and thermometer equipped with a controller to regulate temperature. Poly bd R45HTLO, 67.73 grams (1.254 equivalents), Gelest DMS-H41, 157.38 grams (0.00510 equivalents), AR toluene, 75 grams, and Sivento CPC072, 1.0 grams, were heated with stirring with a nitrogen atmosphere to 85° C. and allowed to react for 48 hours. The resulting mixture was a liquid with a viscosity of 294,000 cP.

Example 7

Silanol-terminated urethane dispersion from polyol from Example 6:

A prepolymer was made in a one liter reaction flask equipped with a heating mantle, condenser, stirring blade, nitrogen inlet, and thermometer equipped with a controller to regulate temperature. Desmodur W, 54.36 grams (0.4149 equivalents), polyol of Example 13, 189.0 grams (0.0340 equivalents), DMPA, 11.64 grams (0.1736 equivalents) and NMP, 45.0 grams were heated with stirring to 50–60 C. Next, DBTDL, 0.075 grams, was added and the mixture was heated to 80° C. and allowed to react for four hours.

A premixture was made with 292.36 grams of distilled water, 4.71 grams of TEA, 2.87 grams of EDA, and 2.28 grams of Dynasylan 1110. The prepolymer, 160.0 grams (0.085 equivalents) was added over 10 minutes to the premixture solution in a Microfluidics Homogenizer Model #HC-8000 at an air line pressure of 0.621 MPa. A stable dispersion was formed.

Example 8

Cured film prepared from the silanol-terminated urethane dispersion of Example 7:

A cured film of the dispersion of Example 7 was made as follows: 1% by weight of Shell Epi-Rez 3510-W60 epoxy dispersion in water was added and mixed until a homogeneous fluid was obtained. An approximately 1.6 mm thick wet film of the liquid was poured onto 3M™ PTFE Extruded Film Tape attached to an aluminum panel substrate. The coating was allowed to dry and cure for seven days at 22° C. and 50% relative humidity. The resulting dry film was approximately 0.4 mm thick. Data obtained from the cured film is shown in Table 2.

TABLE 2

PROPERTIES OF CURED FILM OF EXAMPLE 8

| | |
|---|---|
| Contact Angle: | 109.3 degrees |
| Surface Energy | 18.6 dynes/cm |
| Tensile Strength: | 4.74 MPa |
| Elongation: | 24.1% |
| Epoxy Adhesion: | 1.9 kg |
| Water Weight Gain: | 6.1% |
| Advancing Contact Angle: | 104.9 degrees |
| Receding Contact Angle: | 80.3 degrees |

Example 9

Preparation of Silicone Monohydride

A silicone monohydride was made in a one liter reaction flask equipped with a heating mantle, condenser, stirring blade, nitrogen inlet, and thermometer equipped with a controller to regulate temperature. The following materials were added to the reaction flask and were stirred to form a mixture: FM-0411, 230 grams (0.23 equivalent), TMEDA ,26.72 grams (0.23 equivalent), and toluene, 195 grams. Next, 10.28 grams of trichlorosilane (0.076 equivalents) was added drowse to the mixture while the mixture was being stirred and heated to about 50–60° C. The mixture was allowed to react for 24 hours. After 24 hours, the mixture was quenched with water and the product isolated by extraction with hexane. The organic layer was dried over sodium sulfate. NMR analysis confirmed the completeness of the reaction.

Example 10

Hydrosilation of Poly bd R-45HTLO with silicon monohydride of Example 9 with an olefin/hydride ratio of 25:1:

The silicon monohydride of Example 9 was vacuum stripped for two hours to remove solvent. Hydrosilation was carried out in a 500 ml. reaction flask equipped with a heating mantle, condenser, stirring blade, nitrogen inlet, vacuum, and a thermometer equipped with a controller to regulate temperature. Poly bd R-45HTLO, 45.0 grams (0.833 equivalents), silicon monohydride, 100.0 grams (0.033 equivalents). AR Toluene, 48.3 grams, and Sivento CPC072, 0.50 grams, were heated with stirring and a nitrogen atmosphere to 85° C. and allowed to react for 48 hours. The resulting mixture, a low viscosity liquid, was left in the reaction flask and used to prepare a silanol-terminated urethane dispersion. The theoretical hydroxide equivalent weight of the diol was 5383 grams.

Example 11

Silanol-terminated urethane dispersion from polyol of Example 10:

A prepolymer was made in the flask containing the polyol described in Example 10. Desmodur W, 54.65 grams (0.417 equivalents), DMPA, 11.64 grams (0.174 equivalents), NMP, 45.0 grams, were heated with stirring to 50–60° C. Next, DBTDL, 0.075 grams, was added and the mixture was heated to 80° C. and allowed to react for four hours.

A premixture was made with 301.46 grams of distilled water, 4.72 grams of TEA, 2.16 grams of EDA, and 6.88 grams of Dynasylan 1110. The prepolymer, 160 grams (0.111 NCO equivalents), was added over 10 minutes to the premixture solution in a Microfluidics Homogenizer Model #HC-8000 at an air line pressure of 0.621 MPa. A stable dispersion was formed.

Example 12

Cured film prepared from the silanol-terminated dispersion of Example 11

A cured film of the dispersion of Example 11 was made as follows: 1% by weight of Shell Epi-Rez 3510-W60 epoxy dispersion in water was added and mixed until a homogeneous fluid was obtained. An approximately 1.6 mm thick wet film of the liquid was poured onto 3M PTFE Extruded Film Tape attached to an aluminum panel substrate. The coating was allowed to dry and cure for seven days at 22° C. and 50% relative humidity. The resulting dry film was approximately 0.4 mm thick. Data obtained from the cured film is shown in Table 3.

TABLE 3

PROPERTIES OF CURED FILM OF EXAMPLE 12

| | |
|---|---|
| Contact Angle: | 98.3 degrees |
| Surface Energy: | 31.6 dynes/cm |
| Tensile Strength: | 4.26 MPa |
| Elongation: | 6.2% |
| Epoxy Adhesion: | 2.0 kg |
| Water Weight Gain: | 2.7% |
| Advancing Contact Angle: | 88.3 degrees |
| Receding Contact Angle: | 88.3 degrees |

TABLE 4

Summary of Data

| | Olefin/ Hydride Ratio | % Solids** | Viscosity | % Silicone* |
|---|---|---|---|---|
| Example 1 | 50:1 | 49.5 | Viscous Liquid | 71.5 |
| Example 4 | 100:1 | 75.0 | 54,000 cP | 85.3 |
| Example 5 | 150:1 | 79.8 | 940,000 cP | 79.8 |
| Example 6 | 250:1 | 69.9 | 294,000 cP | 69.9 |
| Comp. Ex. A | 5:1 | 50.0 | Gel | 43.0 |
| Comp. Ex. B | 15:1 | 50.0 | Gel | 14.0 |
| Comp. Ex. C | 10:1 | 44.0 | Gel | 27.4 |
| Comp. Ex. D | 25:1 | 50.0 | Gel | 13.1 |
| Comp. Ex. E | 25:1 | 75.0 | Gel | 14.3 |

TABLE 4-continued

Summary of Data

| | Olefin/<br>Hydride<br>Ratio | % Solids** | Viscosity | % Silicone* |
|---|---|---|---|---|
| Comp. Ex. F | 50:1 | 75.0 | Gel | 52.6 |
| Comp. Ex. G | 150:1 | 75.0 | Gel | 51.5 |

*Calculated at 100% solids
**Approximate calculated value

The complete disclosures of all patents, patent applications, and publications are incorporated herein by reference as if individually incorporated. Various modifications and alterations of this invention may become apparent to those skilled in the art without departing from the scope and spirit of this invention, and it should be understood that this invention is not to be unduly limited to the illustrative embodiments set forth herein.

What is claimed is:

1. A curable composition comprising the hydrosilation product of:
   (a) a polymer comprising a plurality of olefin groups and at least two organic functional groups; and
   (b) an organosiloxane monohydride having the structure illustrated in formula (4):

$$R_4-\underset{\underset{R_4}{|}}{\overset{\overset{R_4}{|}}{Si}}-H \quad (4)$$

wherein $R_4$ has the structure illustrated in formula (5):

$$-X-\underset{\underset{R_5}{|}}{\overset{\overset{R_5}{|}}{Si}}-\left[O-\underset{\underset{R_5}{|}}{\overset{\overset{R_5}{|}}{Si}}\right]_n-O-\underset{\underset{R_5}{|}}{\overset{\overset{R_5}{|}}{Si}}-R_5 \quad (5)$$

wherein:
   n is about 10 or greater;
   $R_5$ is a monovalent organic radical; and
   X is oxygen or a divalent organic linking group.

2. The curable composition of claim 1, wherein $R_5$ is independently selected from the group consisting of $C_{1-10}$ alkyl radicals and phenyl radicals.

3. The curable composition of claim 1, wherein $R_4$ is:

$$nC_4H_9\underset{\underset{CH_3}{|}}{\overset{\overset{CH_3}{|}}{Si}}-\left(O-\underset{\underset{CH_3}{|}}{\overset{\overset{CH_3}{|}}{Si}}\right)_n-O-\underset{\underset{CH_3}{|}}{\overset{\overset{CH_3}{|}}{Si}}-C_4H_9OC_2H_4O-$$

where n is about 10 or greater.

4. The curable composition of claim 1, wherein the at least two organic functional groups are independently selected from the group consisting of hydroxyl, carboxyl, epoxy, amino, silane, silanol, and mercapto.

5. The curable composition of claim 1, wherein the polymer has the structure illustrated in formula (2)

$$HO-\left[\left(\sim\sim\right)_{0.2}\left(\sim\sim\right)_{0.2}\left(\sim\sim\right)_{0.6}\right]_n-OH \quad (2)$$

where n is about 20 or greater.

6. The curable composition of claim 1, wherein the composition has a Brookfield viscosity of less than about 500,000 cP.

7. The curable composition of claim 1, wherein the composition has a Brookfield viscosity of less than about 100,000 cP.

8. The curable composition of claim 1, wherein the curable composition has about 60% weight or greater silicone.

9. The curable composition of claim 1, wherein the curable composition has about 70% weight or greater silicone.

10. A silanol-terminated urethane dispersion manufactured using the curable composition of claim 1.

11. A cured composition comprising the reaction product of a curable composition of claim 1 and a curative.

12. The cured composition of claim 11, wherein the curative is selected from the group consisting of water, polyfunctional isocyanates, polyols, polyamines, epoxies, and combinations thereof.

13. A coating comprising the cured composition of claim 11, wherein the coating has a surface energy of less than about 35 dynes/cm.

14. A coating comprising the cured composition of claim 11, wherein the coating has a surface energy of less than about 25 dynes/cm.

15. A coating comprising the cured composition of claim 11, wherein the coating has a tensile strength of at least about 4 mPa.

16. A curable composition comprising the hydrosilation product of:
   (a) a plurality of polymer molecules each molecule comprising a plurality of olefinic groups and at least two organic functional groups; and
   (b) a plurality of organosiloxane dihydride molecules having the structure illustrated in formula (6):

$$R_6-\underset{\underset{R_6}{|}}{\overset{\overset{R_6}{|}}{Si}}-\left[O-\underset{\underset{R_6}{|}}{\overset{\overset{R_6}{|}}{Si}}\right]_n-O-\underset{\underset{R_6}{|}}{\overset{\overset{R_6}{|}}{Si}}-R_6 \quad (6)$$

wherein:
   n is about 200 or greater;
   $R_6$ is independently selected from the group consisting of monovalent organic radicals, organosiloxane radicals and hydrogen with the proviso that at least two $R_6$ groups are hydrogen;
wherein the organosiloxane dihydride molecules react to crosslink the polymer molecules and wherein the curable composition comprises about 45% weight or greater silicone.

17. The curable composition of claim 16, wherein the ratio of the number of olefin groups to the number of hydride groups prior to the formation of the hydrosilation product is about 20:1 or greater.

18. The curable composition of claim 16, wherein the ratio of the number of olefin groups to the number of hydride groups prior to the formation of the hydrosilation product is about 50:1 or greater.

19. The curable composition of claim 16, wherein the curable composition has about 60% weight or greater silicone.

20. The curable composition of claim 16, wherein the curable composition has about 70% weight or greater silicone.

21. The curable composition of claim 16, wherein n is about 400 or greater.

22. The curable composition of claim 16, wherein n is about 600 or greater.

23. The curable composition of claim 16, wherein the at least two organic functional groups are independently selected from the group consisting of hydroxyl, carboxyl, epoxy, amino, silane, silanol, and mercapto functional groups.

24. The curable composition of claim 16, wherein the polymer has the stricture illustrated in formula 2

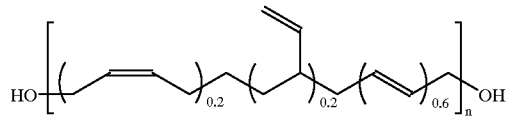

(2)

where n is about 20 or greater.

25. The curable composition of claim 16, wherein the composition has a Brookfield viscosity of less than about 500,000 cP.

26. The curable composition of claim 16, wherein the composition has a Brookfield viscosity of less than about 100,000 cP.

27. A cured composition comprising the reaction product of a curable composition of claim 16 and a curative.

28. The cured composition of 27, wherein the curative is selected from the group consisting of water, polyfunctional isocyanates, polyols, polyamines, epoxies, olefins, and acetylenes.

29. A coating comprising the cured composition of claim 27, wherein the coating has a surface energy of less than about 35 dynes/cm.

30. A coating comprising the cured composition of claim 27, wherein the coating has a surface energy of less than about 25 dynes/cm.

31. A coating comprising the cured composition of claim 27, wherein the coating has a tensile strength of at least about 4 mPa.

32. A method of making a curable composition, said method comprising the steps of:

(a) providing a plurality of polymer molecules each molecule comprising a plurality of olefin groups and at least two organic functional groups;

(b) providing an plurality of organosiloxane monohydride molecules having the structure illustrated in formula (4):

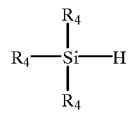

(4)

wherein $R_4$ has the structure illustrated in formula (5):

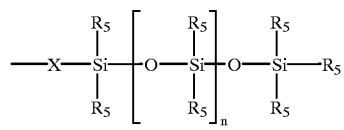

(5)

wherein n is about 200 or greater;

$R_5$ is a monovalent organic radical; and

X is an oxygen atom or a divalent organic linking group; and (c) reacting the plurality of olefin groups of the polymer with the organosiloxane monohydride to form the curable composition.

33. The curable composition of claim 32, wherein $R_5$ is independently selected from the group consisting of $C_{1-10}$ alkyl and phenyl.

34. The curable composition of claim 32, wherein $R_4$ is:

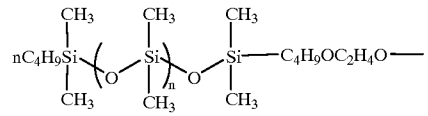

where n is about 10 or greater.

35. The method of claim 32 further including the step of dissolving the polymer and the organosiloxane monohydride in an organic solvent to form a solution.

36. The method of claim 35, wherein the solution has a percent solids of about 45% or greater.

37. The method of claim 32 further including the step of adding a hydrosilation catalyst to at least one of the polymer and the organosiloxane monohydride prior to step (c).

38. The method of claim 37, wherein the hydrosilation catalyst is platinum-divinyltetramethyldisiloxane.

39. The method of claim 32, wherein the curable composition has a Brookfield viscosity less than about 1,000,000 cP.

40. The method of claim 32, wherein the curable composition has about 45% weight or greater silicone.

41. A method of making a curable composition, said method comprising the steps of:

(a) providing a plurality of polymer molecules each polymer molecule comprising a plurality of olefin groups and at least two organic functional groups;

(b) providing a plurality of organosiloxane dihydride molecules having the structure illustrated in formula (6):

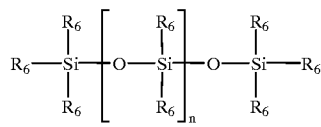
(6)

wherein n is about 200 or greater;

$R_6$ is independently selected from the group consisting of monovalent organic radicals, organosiloxane radicals and hydrogen with the proviso that at least two $R_6$ groups are hydrogen;

(c) crosslinking the polymer molecules by reacting at least a portion of the olefin groups of the polymer molecule with at least a portion of the hydride groups of the organosiloxane dihydride to form a curable composition comprising about 45% weight or greater silicone.

42. The method of claim 41, wherein the polymer and the organosiloxane dihydride are dissolved in an organic solvent to form a solution.

43. The method of claim 42, wherein the solution has a percent solids of about 45% or greater.

44. The method of claim 41 further including the step of adding a hydrosilation catalyst to at least one of the polymer and the organosiloxane dihydride prior to step (c).

45. The method of claim 44, wherein the hydrosilation catalyst is platinum-divinyltetramethyldisloxane.

46. The method of claim 41, wherein the curable composition has a Brookfield viscosity less than about 1,000,000 cP.

47. The method of claim 41, wherein the curable composition has about 60% weight or greater silicone.

48. The method of claim 41, wherein the curable composition has about 70% weight or greater silicone.

* * * * *

UNITED STATES PATENT AND TRADEMARK OFFICE
CERTIFICATE OF CORRECTION

PATENT NO.   : 6,271,309 B1
DATED        : August 7, 2001
INVENTOR(S)  : Gary P. Roberts and Steven J. Vander Louw It is certified that error appears in the above-identified patent and that said Letters Patent is hereby corrected as shown below:

Column 1,
Line 60, "desirablc." should be -- desirable. --

Column 2,
Line 4, "an offshore" should be -- and offshore --

Column 3,
Line 29, "polyftinctional" should be -- polyfunctional --

Column 11,
Line 55, "4,4,4"" should be -- 4,4',4" --

Column 12,
Line 59, "silanc" should be -- silane --
Line 60, "largc" should be -- large --

Column 13,
Line 35, "silanc" should be -- silane --

Column 15,
Line 13, "SLRFYNOL" should be -- SURFYNOL --

Column 16,
Line 18, "Polvmer" should be -- Polymer --

Column 18,
Table of Materials, POLY bd R-45HTLO, ethylene subscript "0.2" should be -- 0.6 --

Column 21,
Line 24, Table 1, "Surface Energy" should be -- Surface Energy: --

UNITED STATES PATENT AND TRADEMARK OFFICE
CERTIFICATE OF CORRECTION

PATENT NO. : 6,271,309 B1
DATED : August 7, 2001
INVENTOR(S) : Gary P. Roberts and Steven J. Vander Louw It is certified that error appears in the above-identified patent and that said Letters Patent is hereby corrected as shown below:

Column 23,
Line 28, Table 2, "Surface Energy" should be -- Surface Energy: --
Line 45, "tolucne" should be -- tolune --

Column 24,
Line 21, "prcmixture" should be -- premixture --
Line 21, "Modcl" should be -- Model --
Line 28, "Example 11" should be -- Example 11: --
Line 35, "Film Tapc" should be -- Film Tape --

Signed and Sealed this

Ninth Day of April, 2002

Attest:

Attesting Officer

JAMES E. ROGAN
Director of the United States Patent and Trademark Office